G. A. BURNHAM.
FEED BAG FOR ANIMALS.
APPLICATION FILED MAY 6, 1911.
1,075,758.
Patented Oct. 14, 1913.
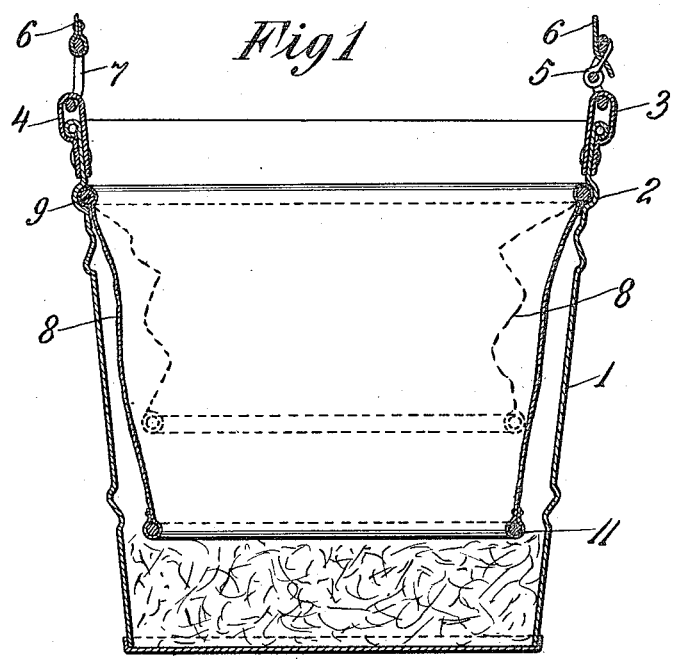
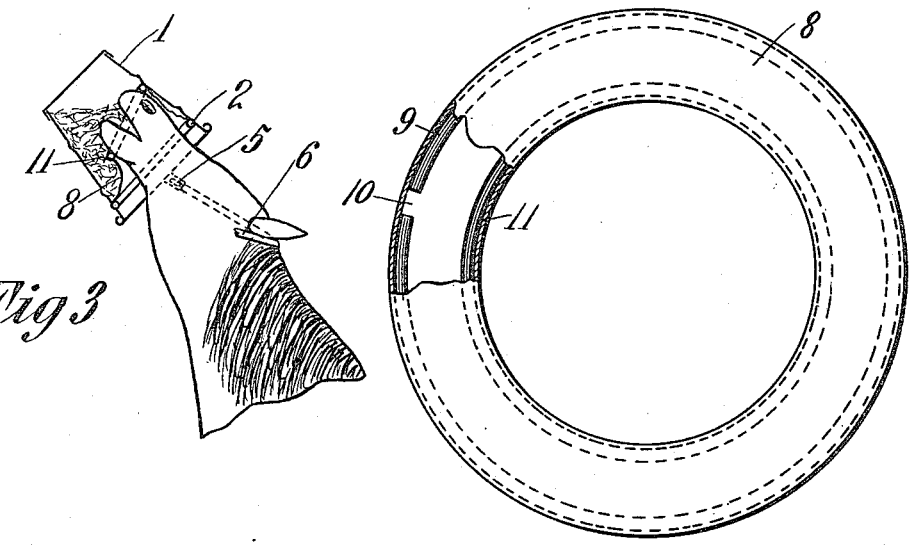

UNITED STATES PATENT OFFICE.

GEORGE A. BURNHAM, OF CLIFTONDALE, MASSACHUSETTS, ASSIGNOR OF ONE-HALF TO THOMAS HOWE, OF NEW YORK, N. Y.

FEED-BAG FOR ANIMALS.

1,075,758.

Specification of Letters Patent.     Patented Oct. 14, 1913.

Application filed May 6, 1911. Serial No. 625,528.

*To all whom it may concern:*

Be it known that I, GEORGE A. BURNHAM, a citizen of the United States, and resident of Cliftondale, in the county of Essex and State of Massachusetts, have invented certain new and useful Feed-Bags for Animals, of which the following is a specification.

This invention relates to devices employed to feed horses or other animals and which are commonly referred to as feed bags although it will be understood that buckets, pails or other suitable receptacles may be used as well as bags properly so called. Such devices are ordinarily so used by placing the food, such as oats for example, in the receptacle and securing the receptacle about the nose of the horse or other animal, by a strap or rope passing over the head. The receptacle therefore is tossed and shaken about as the horse moves his head with the result that with the ordinary nose bag a large percentage of the oats are spilled and wasted.

It is an object of the present invention to provide a device of the character described by which spilling, and consequent waste, of the food is prevented.

It is a further object of the invention to provide a device of the character referred to which is not only so constructed as to prevent spilling of the food but this construction is so accomplished as to render the receptacle readily available as a convenient and suitable pail for watering the horse or for other purposes.

It is a further object of the invention to provide a device of the character referred to which may be kept clean and sanitary.

Other objects of the invention will appear hereinafter.

In the accompanying drawings, which illustrate the invention, Figure 1 is a vertical central section of a feed bag embodying the invention. Fig. 2 is a top plan view of the flexible sleeve partly broken away; and Fig. 3 shows the feeding device of Figs. 1 and 2 applied to a horse's head, the figure showing the position of the device when the horse's nose is thrown upwardly and illustrates the utility of the device in preventing spilling.

Referring to the drawings, the feed receptacle comprises a water-tight sheet-metal structure 1 like a pail. This structure has a circumferential groove 2 in its side walls and at its top, upon opposite sides, is provided with eyes 3 and 4 riveted or otherwise secured to the receptacle. To one of the eyes 3 is secured a buckle 5 fastened to one end of a strap 6 for passing over the horse's head. To the other end of the strap is secured the hook 7 which may be engaged in or disengaged from the eye 4. This affords a convenient means for attaching the device to and detaching it from the animal.

Within the receptacle 2 is a flexible sleeve 8 which may be of textile material such as canvas. In one end of the sleeve 8 is secured a spring ring 9 having a gap 10 to facilitate its springing and which is adapted to be sprung into and out of the groove 2 to secure the edges of the sleeve at that end to the side walls of the receptacle and detach them therefrom. In the other end of the sleeve is secured a ring 11 of sufficient weight to straighten out the sleeve when it hangs freely. This ring is of less diameter than the internal diameter of the receptacle and a clearance exists between the lower end of the sleeve and the side walls of the receptacle. Also the ring 11 serves to spread the lower end of the sleeve and hold the lower edges in proper relative position.

When the oats or other food is placed in the receptacle, the lower end of the sleeve will rest thereon and the sleeve will occupy a position as shown by the dotted lines in Fig. 1, for instance. As the food is consumed the weighted free end of the sleeve will follow it downwardly, occupying successively lower positions, the full lines of Fig. 1, indicating one such position for example, until the food is nearly consumed and the sleeve is straightened out.

Fig. 3, well illustrates the manner in which spilling of the food is prevented. The rigid, stiff receptacle is of such dimensions that the horse has plenty of room to eat and for air, while the inner end of the sleeve through which he obtains access to the food is substantially filled by his muzzle so that practically no food can escape through the sleeve and the sleeve forms a shield against the escape of any food between the horse's head and the side walls of the receptacle as is clearly shown in Fig. 3. The flexibility of the sleeve permits its free end to be moved about within the receptacle as the animal may desire in gaining access to different parts.

When desired, the ring 9 may be sprung out of the groove 2 in the receptacle and the sleeve removed when the receptacle is well adapted for use as a pail for watering the horse or for other purposes. The removal of the sleeve also permits the thorough cleaning of the receptacle and the cleansing or renewal of the sleeve so that the whole may be kept clean and sanitary.

While the invention has been illustrated in what is considered its best application, it is realized that modifications might be made in the structure shown without departing from the invention which, therefore, is not limited to the structure shown in the drawings.

What I claim is:

1. In a device of the character described, the combination of a rigid water-tight feed receptacle, adapted to be secured to an animal, and a flexible sleeve within said receptacle, said sleeve having its edges at one end detachably secured to said receptacle, the other end of said sleeve being unsecured to said receptacle, there being a clearance between the unsecured end of said sleeve and the side walls of said receptacle.

2. In a device of the character described, the combination of an imperforate feed receptacle, adapted to be secured to an animal, a flexible sleeve within said receptacle, said sleeve having its edges at one end detachably secured to said receptacle, the other end of said sleeve being unsecured to said receptacle, and a ring at the end of said sleeve which is unsecured to said receptacle, there being a clearance between the unsecured end of said sleeve and the side walls of said receptacle.

3. In a device of the character described, the combination with a water-tight sheet metal feed receptacle, of a flexible sleeve therein, said receptacle having a groove in its side walls, a spring ring adapted to engage in said groove and secure one end of said sleeve to said receptacle, and a ring secured to the other end of said sleeve, the last mentioned ring being of less diameter than the internal diameter of said receptacle.

4. A combined feed bag and water bucket comprising a rigid, imperforate container, a tapering sleeve of flexible material adapted to fit within said container, means for holding the small end of said sleeve distended, while leaving it free to swing laterally, and means for detachably locking the large end of said sleeve to the walls of said receptacle, substantially as described.

5. In a feeding device for animals, the combination with a sheet metal feed receptacle, of a flexible sleeve within said receptacle, said sleeve being open at both ends, having its upper end detachably secured to the walls of said receptacle and its other end free of said receptacle.

Signed at Boston in the county of Suffolk and State of Massachusetts, this 2nd day of May A. D. 1911.

GEORGE A. BURNHAM.

Witnesses:
C. C. BODEAU,
H. W. CALDER.

---

Copies of this patent may be obtained for five cents each, by addressing the "Commissioner of Patents, Washington, D. C."